(12) United States Patent
Adeyemi (10) Patent No.: US 9,347,597 B2
(45) Date of Patent: May 24, 2016

(54) AIRCRAFT TOOL

(71) Applicant: AIRBUS OPERATIONS LIMITED, Bristol (GB)

(72) Inventor: Marie Adeyemi, Bristol (GB)

(73) Assignee: Airbus Operations Limited, Bristol (GB)

( * ) Notice: Subject to any disclaimer, the term of this patent is extended or adjusted under 35 U.S.C. 154(b) by 624 days.

(21) Appl. No.: 13/684,351

(22) Filed: Nov. 23, 2012

(65) Prior Publication Data

US 2013/0127152 A1    May 23, 2013

(30) Foreign Application Priority Data

Nov. 23, 2011  (GB) .................................... 1120239.7

(51) Int. Cl.
*F16L 55/00* (2006.01)
*B25B 27/00* (2006.01)
*F16L 1/10* (2006.01)

(52) U.S. Cl.
CPC ............. *F16L 55/00* (2013.01); *B25B 27/0028* (2013.01); *F16L 1/10* (2013.01)

(58) Field of Classification Search
CPC ........ B25B 27/10; B25B 27/14; B21D 1/145; B21D 39/46
USPC .............................. 29/237, 244, 255, 270, 278
See application file for complete search history.

(56) References Cited

U.S. PATENT DOCUMENTS

| | | | |
|---|---|---|---|
| 5,226,678 A | 7/1993 | Petranto | |
| 6,182,347 B1 * | 2/2001 | Reed et al. | 29/426.5 |
| 2002/0042979 A1 * | 4/2002 | Ishida et al. | 29/237 |
| 2005/0050702 A1 * | 3/2005 | Green | 29/263 |
| 2006/0101634 A1 * | 5/2006 | Sweeney | 29/468 |
| 2010/0326671 A1 * | 12/2010 | Buytaert et al. | 166/378 |
| 2012/0227221 A1 * | 9/2012 | Whitaker et al. | 24/459 |
| 2013/0127152 A1 * | 5/2013 | Adeyemi | 285/39 |
| 2013/0341907 A1 * | 12/2013 | Lutzer | 285/39 |

FOREIGN PATENT DOCUMENTS

| | | |
|---|---|---|
| GB | 1 307 741 | 5/1970 |
| GB | 2 085 782 | 5/1982 |
| GB | 2 212 780 | 8/1989 |
| JP | 2010/106966 | 5/2010 |
| WO | WO 2012/084695 | 6/2012 |

OTHER PUBLICATIONS

Search Report for GB 1120239.7 dated Jul. 31, 2012.
Search Report for GB 1120239.7 dated Mar. 15, 2012.

* cited by examiner

*Primary Examiner* — Lee D Wilson
(74) *Attorney, Agent, or Firm* — Nixon & Vanderhye P.C.

(57) ABSTRACT

A guidance tool for restricting the potential angular misalignment between the axial centerlines of a pipe end and a corresponding socket arrangement during a pipe installation process. The guidance tool may include a sleeve and a clamp configured to removably engage the sleeve with an external surface of a pipe end, such that at least part of the sleeve and pipe end may be inserted into a corresponding socket arrangement.

19 Claims, 9 Drawing Sheets

AIRCRAFT TOOL

This application claims priority to GB 1120239.7 filed 23 Nov. 2011, the entire contents of which is hereby incorporated by reference.

BACKGROUND OF THE INVENTION

The present invention concerns a tool for use in aircraft construction. More particularly, but not exclusively, this invention concerns a tool and method for installation of a pipe end within a socket, wherein the pipe end and the socket are part of an aircraft fuel system.

In a typical aircraft fuel pipe system installation process, the fuel pipe connectors comprising pipe-end receiving socket arrangements are installed in the aircraft structure prior to the fuel pipes being installed. An aircraft engineer may then manually install the fuel pipes by pushing the fuel pipe ends into the fuel pipe connectors. During this push-fit installation, it is important that the angular misalignment between the axial centrelines of the pipe end and the socket is minimised in order to avoid damage to the pipe end or the socket arrangement. Damage to the pipe end or the socket arrangement may include damage to a seal between the pipe end and the socket arrangement. Damage to the pipe end or the socket arrangement during the installation process may lead to potentially costly and hazardous fuel leakages during use of the aircraft.

Typically, the tolerance level required is no more than ±2 degrees angular misalignment between the axial centrelines of the pipe end and the socket arrangement. However, it may be difficult to measure and/or monitor the accuracy achieved during the push fit process. Additionally, it is desirable to maintain a gap between the end of the pipe end and the socket arrangement, that allows the pipe end to float in a longitudinal direction when installed in the socket arrangement. In the aircraft industry this is typically known as the coupling gap.

The present invention seeks to mitigate the above-mentioned problems.

SUMMARY OF THE INVENTION

The present invention provides, according to a first aspect, a guidance tool for restricting the potential angular misalignment between the axial centrelines of a pipe end and corresponding socket arrangement during a pipe installation process, the guidance tool comprising:
a sleeve; and
a clamp; wherein the clamp is configured to removably engage the sleeve with an external surface of a pipe end, such that at least part of the sleeve and pipe end may be inserted into a corresponding socket arrangement.

The guidance tool, when engaged with a pipe end, restricts the potential angular misalignment between the axial centrelines of a pipe end and corresponding socket arrangement when the pipe end is pushed into the socket arrangement. The sleeve reduces the free space between the external surface of a pipe end and the internal surface of a corresponding socket arrangement, the free space which may allow angular misalignment of the pipe end and socket arrangement beyond the desired tolerance levels during the pipe installation process. The sleeve may remove substantially all of the free space between the external surface of a pipe end and the internal surface of a corresponding socket arrangement during installation of the pipe end into the socket arrangement.

The clamp may be configured to allow removal of the sleeve from engagement with the external surface of a pipe end, once the pipe end has been inserted into a corresponding socket arrangement.

The sleeve may be approximately cylindrical. The sleeve may comprise a first half and a second half, the first half and second half being distinct and separate elements. The first half and the second half of the sleeve may be connected to each other by a hinge.

The clamp may be approximately cylindrical. The clamp may comprise a first half and second half, the first half and second half being distinct and separate elements. The clamp may comprise a locking mechanism to maintain the sleeve in removable engagement with a pipe end when the locking mechanism is in the locked position. The locking mechanism may allow removal of the sleeve from removable engagement with a pipe end when the locking mechanism is in the unlocked position. The locking mechanism may be one or more fasteners. The one or more fasteners may be quick release fasteners, for example spring loaded fasteners. The one or more fasteners may be a screw, Allen bolt, or any other suitable joining means. The clamp may comprise a first half and a second half, the first half and second half connected to each other by a hinge. The first half and second half of the clamp may respectively include a first protrusion and second protrusion, such that bringing the first protrusion and second protrusion into contact locks the clamp. A clip may maintain the first protrusion and second protrusion in contact with each other. Alternatively, an engineer may hold the first protrusion and second protrusion together during the installation process in order to lock the clamp into position. In such an arrangement, the clamp may be easily unlocked by releasing the first protrusion and second protrusion, thereby allowing easy removal of the installation device from a pipe end and socket arrangement when connecting the two. The external surface of the clamp may include features configured to allow an engineer to hold the clamp together. The external surface of the clamp may include gripping portions.

The clamp may be arranged to limit the extent to which the sleeve may be inserted into the socket arrangement. The clamp may be arranged to abut the socket arrangement when the pipe end is in the desired installed position.

The clamp and the sleeve may be separable and distinct elements. Alternatively the clamp and the sleeve may be integrated such that they are not separable. A first half of the sleeve may be integrated with a first half of the clamp and the second half of the sleeve may be integrated with the second half of the clamp. The integrated halves may be formed by a single moulding or machining process.

The guidance tool may comprise a material chosen to be softer than the material from which the pipe end and socket arrangement the guidance tool is designed to be used with is made of. The guidance tool may comprise a plastics material. The plastics material may be nylon or any other suitable material. The softer material may reduce the possibility that the guidance tool damages a pipe end or socket arrangement during the installation process. The guidance tool may comprise a low-friction material. A low-friction material may facilitate the installation of the pipe end and guidance tool within the socket arrangement.

The guidance tool may be arranged for use with single or double walled pipe ends and single or double walled socket arrangements. The clamp and/or the sleeve may include sections of material that have been removed in order to avoid damage to features of pipe ends or socket arrangements, for example bonding lugs.

A second aspect of the invention provides a pipe end and a guidance tool removably engaged with the pipe end, the guidance tool as substantially described with respect to the first aspect of the invention.

A third aspect of the invention provides a pipe end fitting and a guidance tool removably engaged with the pipe end, the invention further including a socket arrangement, whereby the pipe end and guidance tool at least partially extend into the socket arrangement.

A fourth aspect of the invention provides a method of installing a pipe end into a socket arrangement in an aircraft structure, the method comprising the steps of:

removably engaging a guidance tool according to a first aspect of the invention with the pipe end;

inserting the pipe end and guidance tool at least partially into the socket arrangement; and removing the guidance tool from the pipe end.

The guidance tool may be as described with respect to any of the first, second, or third aspects of the invention.

Removably engaging a guidance tool with the pipe end may comprise the step of locking the guidance tool to the pipe end fitting. The step of locking the guidance tool to the pipe end fitting may comprise the use of quick release fasteners. The step of locking the guidance tool to the pipe end fitting may comprise an installation engineer physically biasing the guidance tool into contact with the pipe end during the installation process. Removing the guidance tool from the pipe end may comprise unlocking the guidance tool. The guidance tool may be removed from the pipe end by sliding it away from and out of the socket arrangement, then opening the guidance tool to allow it to be fully removed from the pipe end. The guidance tool may be opened by being split into two or more parts. The guidance tool may comprise a hinge allowing expansion of the tool without the tool being fully split into two or more parts. This may reduce the possibility of parts of the guidance tool being lost.

A fifth aspect of the invention provides an aircraft, the aircraft comprising a pipe structure constructed according to the method described above or using a guidance tool as described above with regards to any aspect of the invention.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
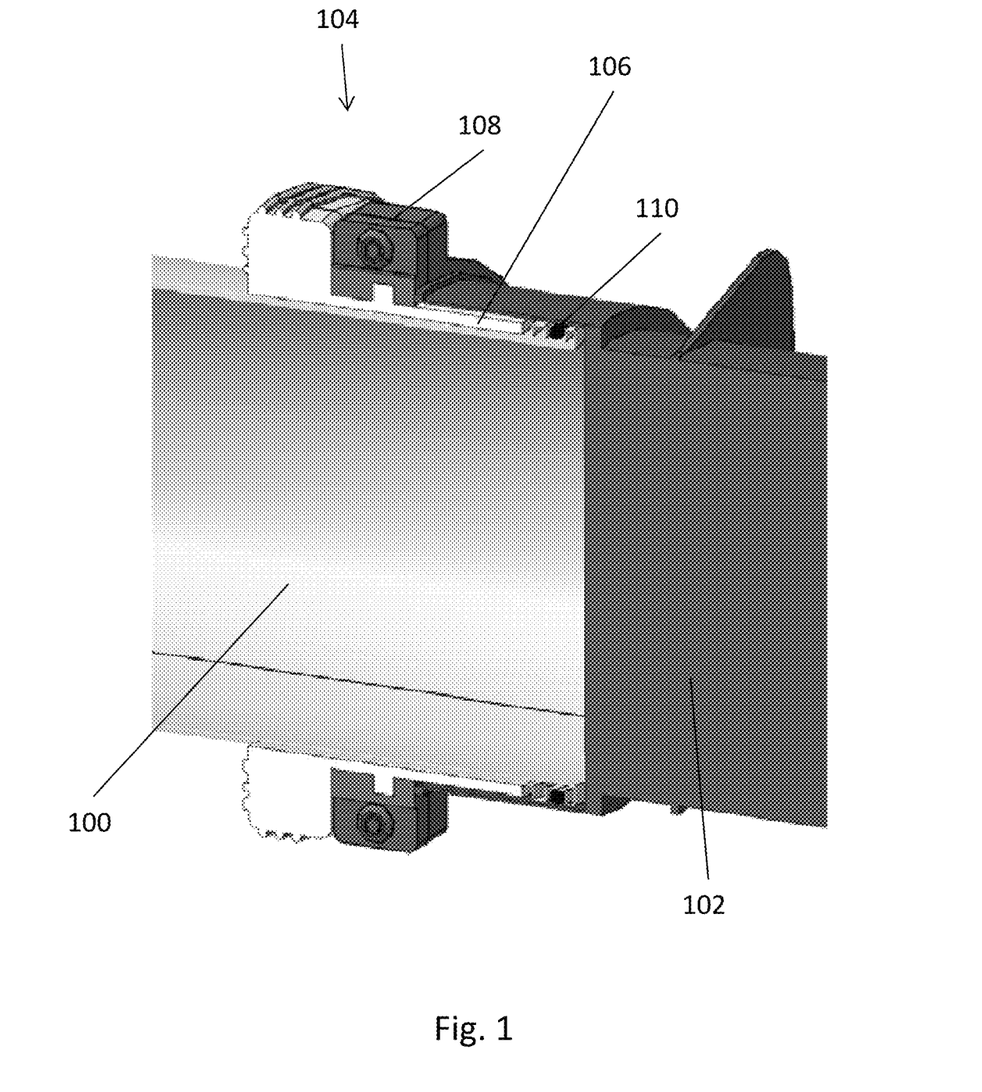
FIG. 1 shows a cross-section view of a guidance tool and fuel pipe coupling according to a first embodiment of the invention.

FIG. 1 shows a fuel pipe coupling in an aircraft, the fuel pipe coupling comprising a pipe end 100, a socket arrangement 102, and a guidance tool 104. The pipe end 100 is partially inserted within the socket arrangement 102. The guidance tool 104 comprises a sleeve 106 and a clamp 108. The sleeve 106 is held in removable engagement with the outer surface of the pipe 100 by the clamp 108. As can be seen in FIG. 1, the sleeve 106 is at least partially inserted into the socket 102 such that it removes part of the free space between the outer surface of the pipe 100 and the inner surface of the socket arrangement 102. This free space is to allow slight angular movement of the pipe coupling when the aircraft is in the air. Such angular movement may be caused by vibration of the aircraft during flight. However, during the pipe installation process, when the pipe end 100 is inserted into the socket arrangement 102, the free space may allow angular misalignment of the axial centrelines of the fuel pipe 100 and socket arrangement 102 to an extent where the fuel pipe coupling is damaged. The damage may be to the seal 110 located between the far end of the pipe end 100 and the socket arrangement 102, or other elements of the fuel pipe coupling.

The arrangement as described for FIG. 1 allows the pipe end 100 to be inserted into the socket arrangement 102 with the potential for angular misalignment between the axial centrelines of the pipe end 100 and the socket arrangement 102 restricted to no more than ±2 degrees, due to the removal of the free space by the sleeve 106 as described above. The clamp 108 abuts the socket arrangement 102 limiting the distance the sleeve 106 may be inserted into the socket arrangement 102. The clamp 108 may also be used to control the gap between the end of the pipe end 100 and the socket arrangement 102, such that the pipe end 100 and socket arrangement 102 are joined with a coupling gap.

Figure 2:
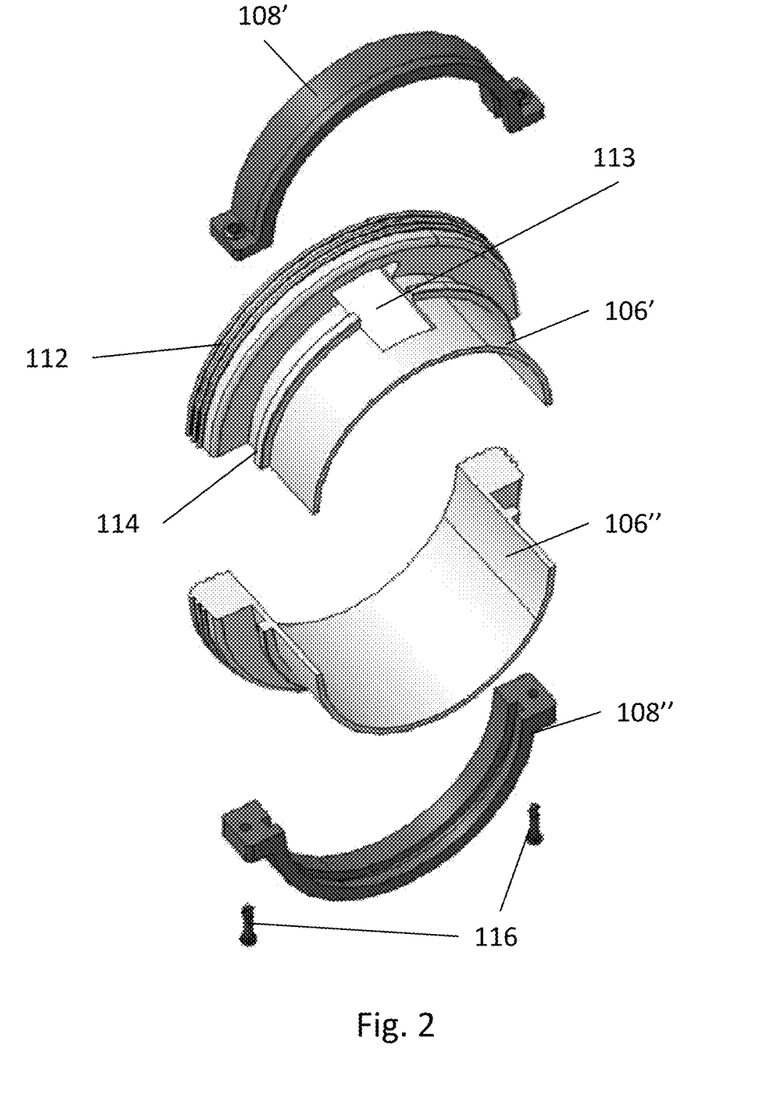
FIG. 2 shows an exploded view of the guidance tool according to the first embodiment of the invention.

FIG. 2 shows the guidance tool 104 in greater detail than in FIG. 1. The sleeve 106 comprises a first half 106' and a second half 106". It can be seen that the two halves, 106' and 106", when put together, form a sleeve with a cylindrical inner surface. The cylindrical inner surface is shaped and sized to engage with the pipe end 102. The first half of the sleeve 106' includes a cut-out portion 113 where the sleeve material has been removed. The cut-out portion 113 is arranged to prevent the sleeve 106 from fouling features of the pipe end 100 or socket arrangement 102 such as bonding lugs during the installation process and removal of the sleeve 106. The clamp 108 comprises a first half 108' and a second half 108". The clamp 108 may be placed around the sleeve 106 and locked in position to removably engage the sleeve with the pipe end 100. In this embodiment the clamp is locked in position by use of the quick-release fasteners 116. The sleeve includes a flange portion 112 against which the clamp 108 is arranged to abut, and a male insert 114 located on the outer surface of the sleeve 106 arranged to engage with a female insert on the inner surface of the clamp 108 to ensure the correct location of the clamp 108.

Figure 3:
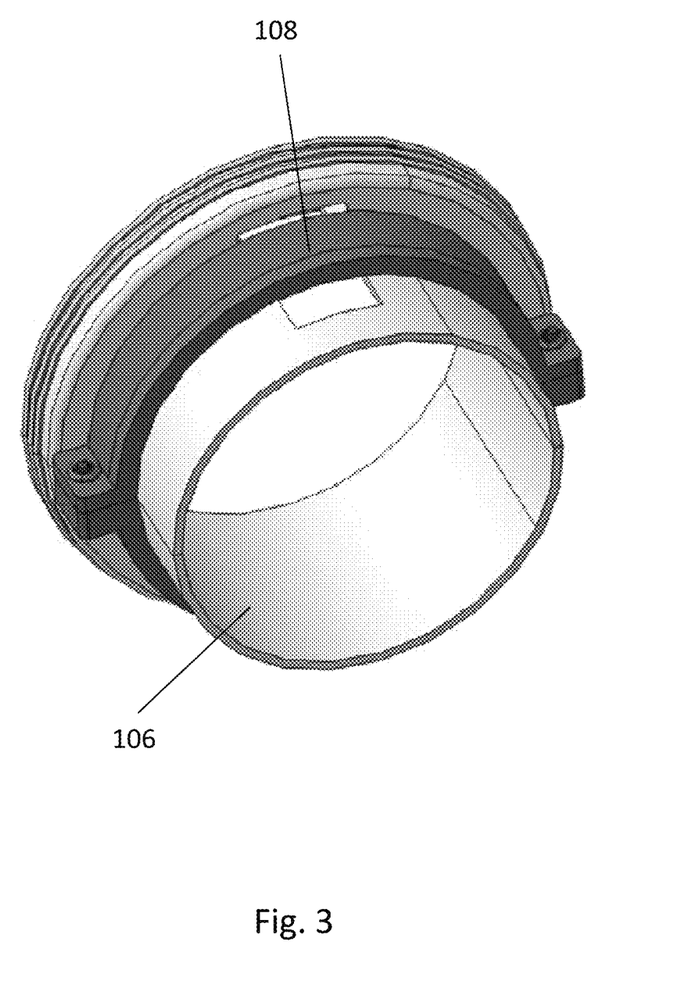
FIG. 3 shows an isometric view of the guidance tool according to the first embodiment of the invention.

FIG. 3 shows the guidance tool as shown in FIGS. 1 and 2, where the first half 106' and second half 106" of the sleeve 106 are in contact with each other, and the clamp 108 is locked in position around the sleeve 106.

Figure 4:
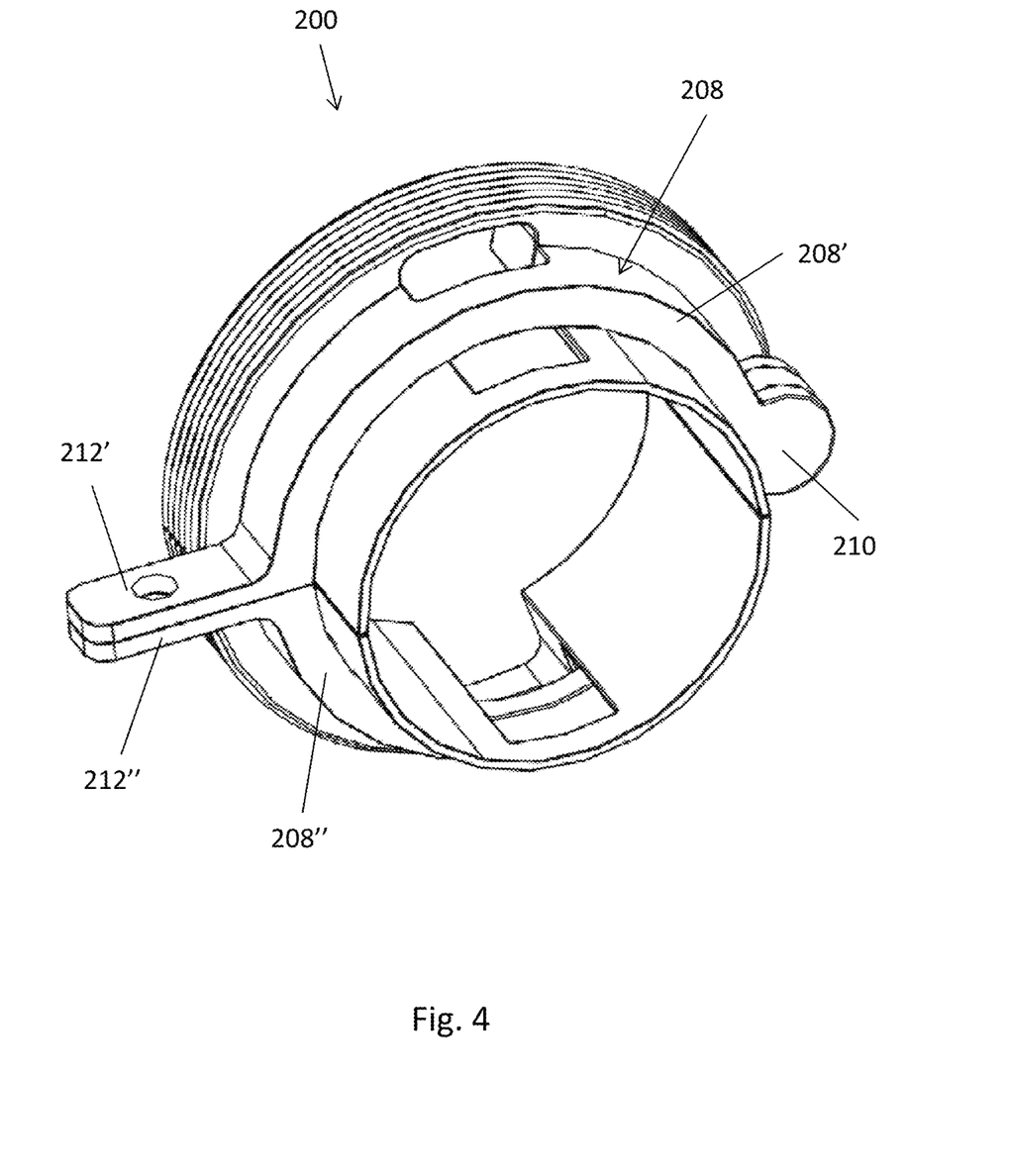
FIG. 4 shows an isometric view of a guidance tool according to a second embodiment of the invention.

FIG. 4 shows a guidance tool 200 according to a second embodiment of the invention. The sleeve 206 is essentially the same as the sleeve 106. The clamp 208 comprises a first half 208' and a second half 208" that are joined via a hinge arrangement 210. Each half of the clamp 208', 208" includes a protrusion 212', 212", approximately opposite the hinge arrangement 210. The two protrusions 212', 212", may be held together manually to lock the clamp 208 in position on the sleeve 206. Such an arrangement may increase the ease of use of the guidance tool as no additional fastening mechanism is required. Additionally, the two halves of the clamp, 208', 208", are connected together by the hinge arrangement 210, reducing the possibility of losing one half of the clamp. In alternative embodiments, the two protrusions 212', 212", may be locked together using a clip or other suitable mechanical locking mechanism.

Figure 5:
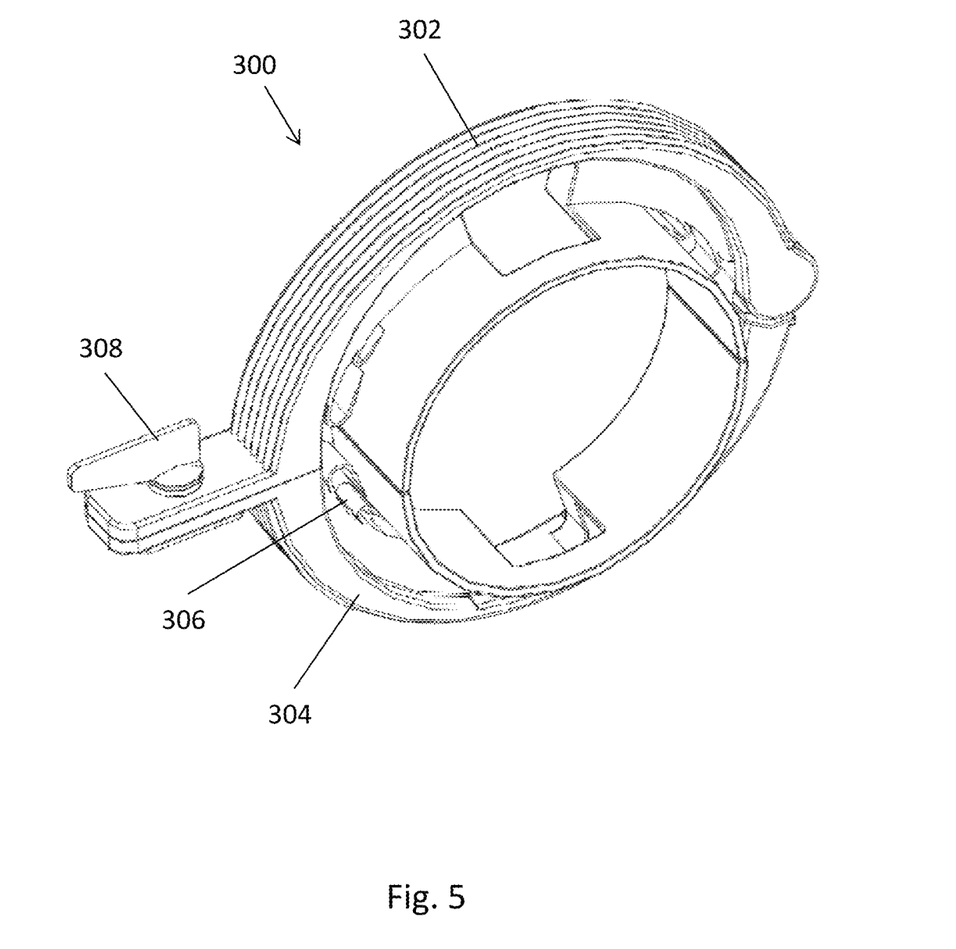
FIG. 5 shows an isometric view of a guidance tool according to a third embodiment of the invention.

FIG. 5 shows a guidance tool 300 according to a third embodiment of the invention. In this embodiment the guidance tool comprises a first half 302 and a second half 304, each half comprising a single moulded piece combining both the function of a sleeve and clamping arrangement. Functionally, the guidance tool is fastened to a pipe end in the same way as the guidance tool substantially as described with reference to FIG. 4. The guidance tool 300 includes a fastener 308 arranged to lock the first half 302 and second half 304 together. Providing two, one-piece, halves that are hinged together reduces the possibility of losing parts of the guidance tool and may increase the ease of use of the tool during a pipe fitting operation. The first half 302 and second half 304 each include a U-grip 306, the U grips 306 configured such that when the clamp is fastened around a pipe end, the U-grips compress the sleeve arrangement onto the surface of the pipe end.

Figure 6:
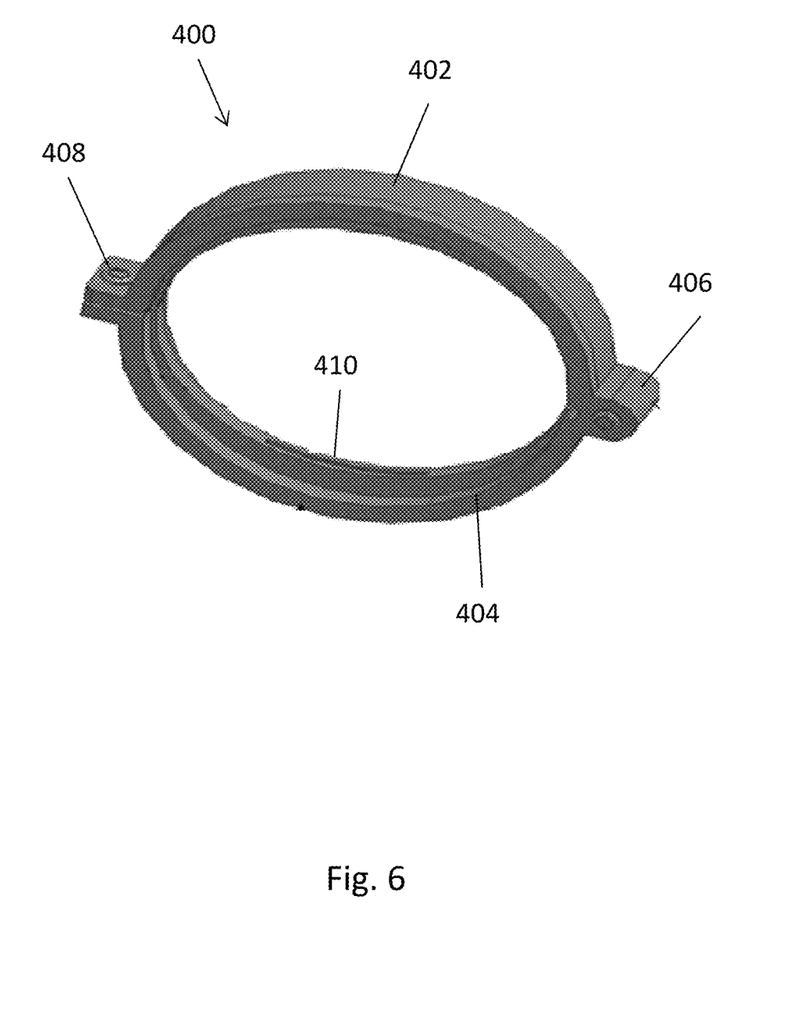
FIG. 6 shows an isometric view of a clamp for use with a guidance tool according to a fourth embodiment of the invention.

FIG. 6 shows a clamp 400 according to a fourth aspect of the invention. The clamp 400 is approximately oval shaped and comprises a first half 402 and a second half 404, the two halves 402, 404, connected together by a hinge arrangement 406 and a fastening arrangement 408. Each half 402, 404, includes a female insert 410 to allow the clamp to be located on a suitable sleeve. Providing an oval clamp 400 as shown in FIG. 4, may allow the clamp to be used with a number of different sized sleeves, each sleeve being specifically sized for a certain pipe end diameter. The sleeves for use with the oval clamp may include a standard size male part for insertion into the female insert 410. The female insert 410 may be arranged to receive a number of different sized shims in order that the clamp 400 may be used on different sized sleeves. Providing an adjustable clamp as shown in FIG. 6 may increase the versatility of the clamp such that it may be used in a variety of guidance tool configurations, each configuration specific to a particular pipe end or socket diameter.

Figure 7A:
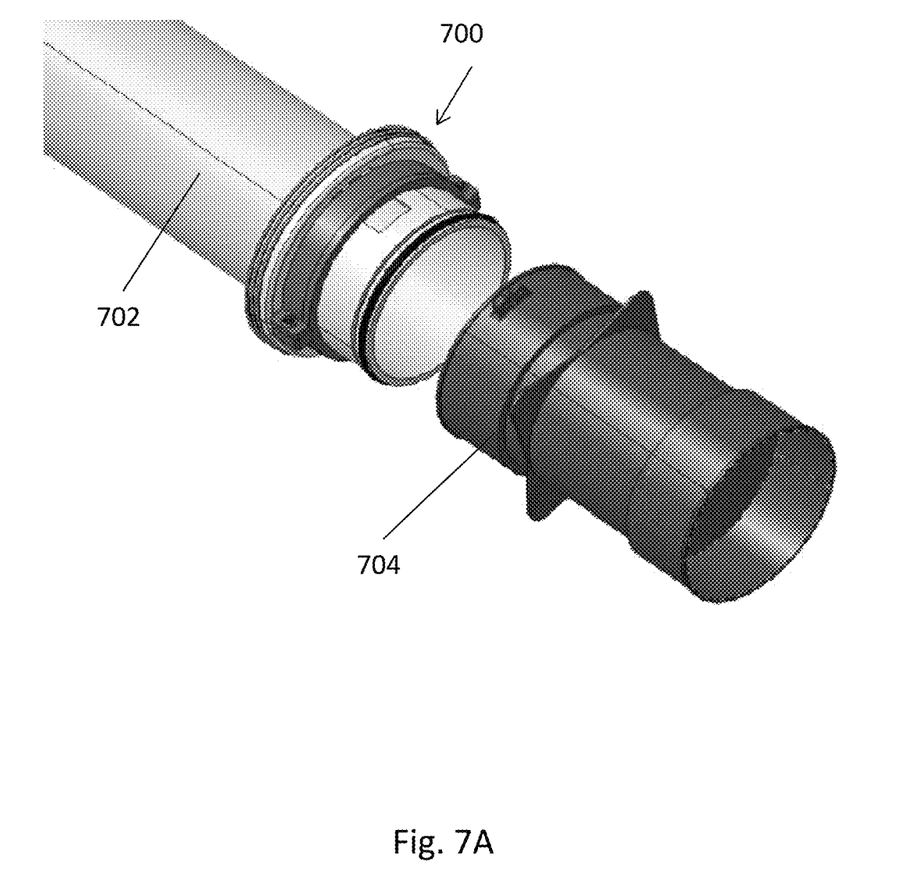
FIGS. 7A and 7B show a pipe connection method according to a fifth embodiment of the invention.
Figure 7B:
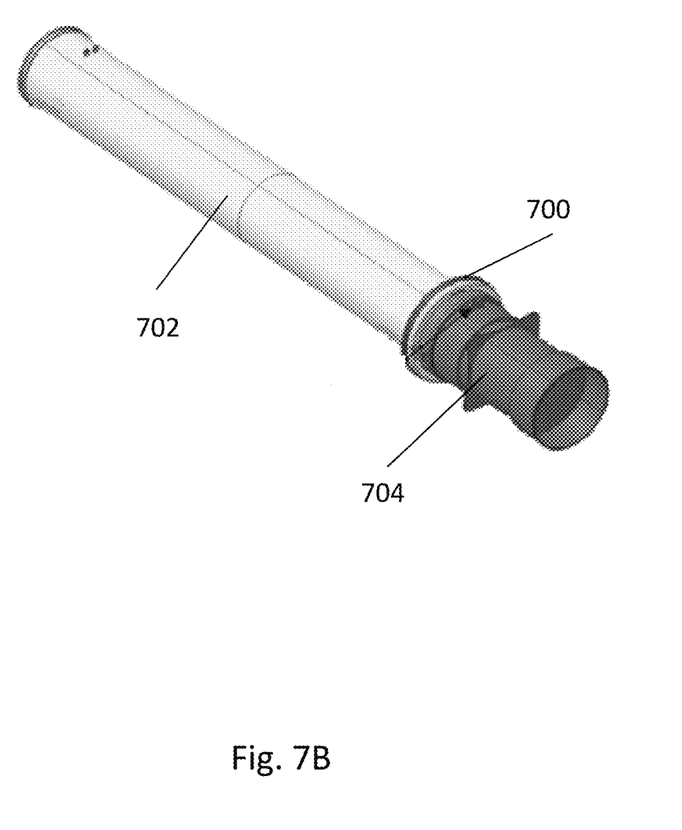

FIGS. 7A and 7B show a pipe installation method according to a fifth aspect of the invention. FIG. 7A show a guidance tool 700 fastened to a pipe end 702 prior to the pipe end 702 being manually inserted into a socket arrangement 704. In this case the socket arrangement 700 corresponds to that described in relation to the first embodiment of the invention but it will be appreciated any of the described guidance tools may be used. Once the guidance tool 700 has been fastened to the pipe end 702, the pipe end 702 and guidance tool 700 are partially inserted into the socket arrangement 704, as shown in FIG. 7B. Once the pipe end 702 is properly located in the socket arrangement 704, the guidance tool is removed from the pipe end fitting 702, in this case by removing the fasteners from the clamp and sliding the sleeve away from the socket arrangement 704 and out of engagement with the pipe end 702.

Figure 8:
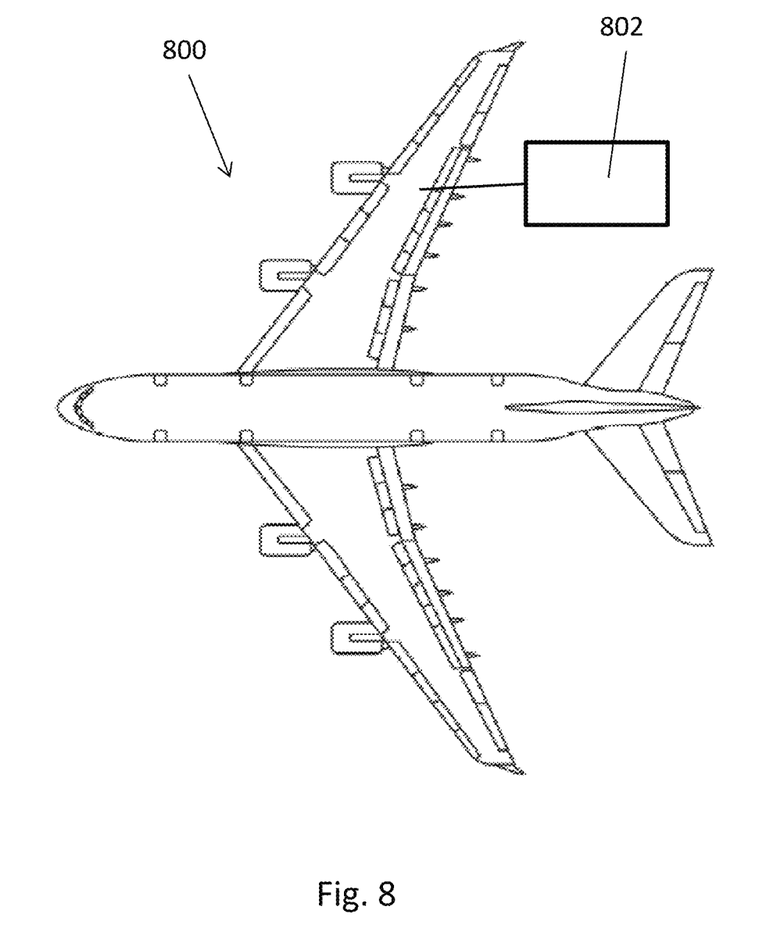
FIG. 8 shows an aircraft comprising a fuel system including a fuel pipe connection according to a sixth embodiment of the invention.

FIG. 8 shows an aircraft 800 including a fuel pipe system including a fuel pipe coupling 802 that has been installed using a guidance tool according to any of the above described embodiments of the invention.

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A guidance tool for restricting the potential angular misalignment between the axial centerlines of a pipe end and corresponding socket arrangement during a pipe installation process, the guidance tool comprising:
   a sleeve assembly including sleeve segments, wherein each sleeve segment has side edges, is arc shaped in cross section and has a radially outwardly extending ridge perpendicular to the axial centerline, and wherein the sleeve segments are configured to be arranged on pipe end such that the side edge of one of the sleeve segment is adjacent the side edge of another one of the sleeve segments; and
   a clamp including a radially inwardly facing clamping surface configured to extend circumferentially around the sleeve assembly while arranged on the pipe end, the clamping surface including a circumferential groove configured to receive the ridges of the sleeve segments, and the clamp is configured to removably engage the sleeve with an external surface of a pipe end, such that at least part of the sleeve assembly and the pipe end may be inserted into a corresponding socket arrangement and wherein the clamp is configured to allow removal of the sleeve assembly from engagement with the external surface of a pipe end, once the pipe end has been inserted into a corresponding socket arrangement.

2. A guidance tool as claimed in claim 1, wherein the sleeve assembly is cylindrical.

3. A guidance tool as claimed in claim 1, wherein the sleeve segments include a first half sleeve segment and a second half sleeve segment, the first half and second half sleeve segments being distinct and separate elements.

4. A guidance tool as claimed in claim 1, wherein the sleeve segments comprises a first half sleeve segment and a second half sleeve segment, the first half and the second half sleeve segments are connected to by a hinge.

5. A guidance tool as claimed in claim 1, wherein the clamp is approximately cylindrical.

6. A guidance tool as claimed in claim 1, wherein the clamp comprises a first half clamp segment and second half clamp segment, the first half and second half clamp segments being distinct and separate elements.

7. A guidance tool as claimed in claim 1, wherein the clamp comprises a locking mechanism arranged to maintain the sleeve assembly in removable engagement with the pipe end when the locking mechanism is in the locked position.

8. A guidance tool as claimed in claim 7, wherein the locking mechanism is arranged to allow removal of the sleeve assembly from removable engagement with a pipe end when the locking mechanism is in the unlocked position.

9. A guidance tool as claimed in claim 7, wherein the locking mechanism is one or more fasteners.

10. A guidance tool as claimed in claim 1, wherein the clamp comprises a first half and a second half, the first half and second half connected to each other by a hinge.

11. A guidance tool as claimed in claim 10, wherein the first half and second half of the clamp respectively include a first protrusion and second protrusion, such that bringing the first protrusion and second protrusion into contact locks the clamp.

12. A guidance tool as claimed in claim 1, wherein the clamp comprises an outer surface including a gripping arrangement.

13. A guidance tool as claimed in claim 1, configured to limit the distance the pipe end may be inserted into the socket arrangement during a pipe installation process.

14. A pipe end and a guidance tool removably engaged with the pipe end, the guidance tool according to claim 1.

15. A pipe end fitting and a guidance tool removably engaged with the pipe end, and a socket arrangement, whereby the pipe end and guidance tool at least partially extend into the socket arrangement, the guidance tool according to claim 1.

16. A method of installing a pipe end into a socket arrangement in an aircraft structure, the method comprising the steps of:
removably engaging a guidance tool according to claim 1 with the pipe end;
inserting the pipe end and guidance tool at least partially into the socket arrangement; and
removing the guidance tool from the pipe end.

17. A method as claimed in claim 16 wherein the step of removably engaging the guidance tool with the pipe end comprises the step of locking the guidance tool to the pipe end fitting.

18. A method as claimed in claim 17, wherein the step of removing the guidance tool from the pipe end comprises unlocking the guidance tool.

19. A method as claimed in claim 16, wherein the guidance tool is removed from the pipe end by sliding the guidance tool away from and out of the socket arrangement.

\* \* \* \* \*